United States Patent
Morin

[11] Patent Number: 6,044,662
[45] Date of Patent: *Apr. 4, 2000

[54] PROCESS FOR THE FORMING OF GLASS PLATES AND APPLICATION OF THE PROCESS TO OBTAIN GLAZINGS WITH COMPLEX SHAPES

[75] Inventor: Claude Morin, Courbevoie, France

[73] Assignee: Saint Gobain Vitrage, Courbevoie, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,377

[22] Filed: May 7, 1997

Related U.S. Application Data

[63] Continuation of application No. 08/392,739, filed as application No. PCT/FR94/00847, Jul. 7, 1994, abandoned.

[30] Foreign Application Priority Data

Jul. 9, 1993 [FR] France ................................. 93/08455

[51] Int. Cl.⁷ ..................... C03B 23/025; C03B 23/03; C03B 23/035
[52] U.S. Cl. ................... 65/107; 65/106; 65/290
[58] Field of Search ................... 65/106, 107, 182.2, 65/287–291

[56] References Cited

U.S. PATENT DOCUMENTS

| | | | |
|---|---|---|---|
| 4,778,507 | 10/1988 | Aruga et al. | 65/106 |
| 5,340,375 | 8/1994 | Anttonen | 65/104 |
| 5,372,624 | 12/1994 | Lesage | 65/106 |

FOREIGN PATENT DOCUMENTS

| | | |
|---|---|---|
| 0183418 | 6/1986 | European Pat. Off. . |
| 0520886 | 12/1992 | European Pat. Off. . |
| 9306052 | 4/1993 | WIPO . |

*Primary Examiner*—Jan Ludlow
*Attorney, Agent, or Firm*—Oblon, Spivak, McClelland, Maier & Neustadt, P.C.

[57] ABSTRACT

A method for bending a sheet of glass heated to a bending temperature in a horizontal furnace through which it is conveyed by a plane conveyor delivering the glass sheet to a bending cell heated to substantially the same temperature as the bending temperature. A concave annular recessed portion provides gravity preshaping and then moves the glass sheet vertically towards a solid convex projecting portion within the cell, so that the sheet is squeezed between the concave and convex portions. A device for carrying out the method and its use for producing glazing with a particularly complex shape are are disclosed.

17 Claims, 3 Drawing Sheets

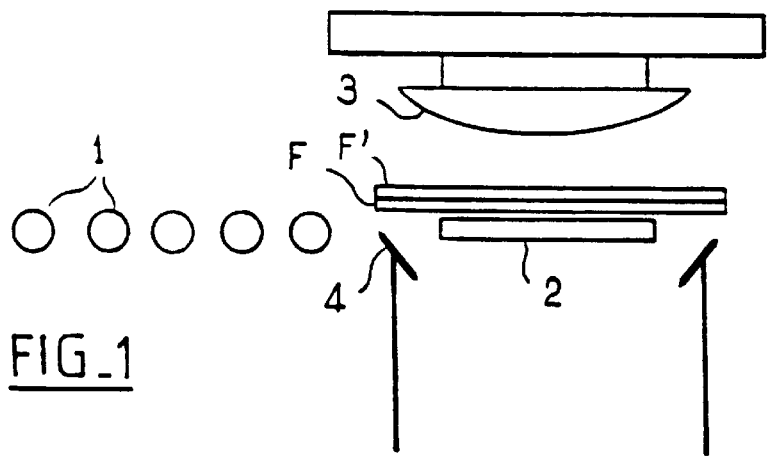
FIG_1
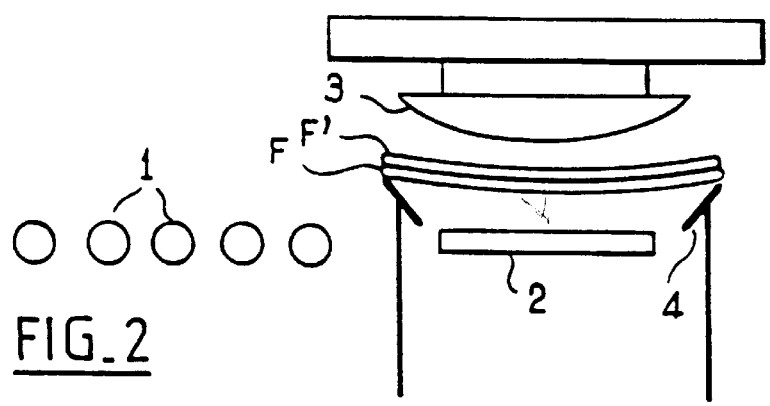
FIG_2
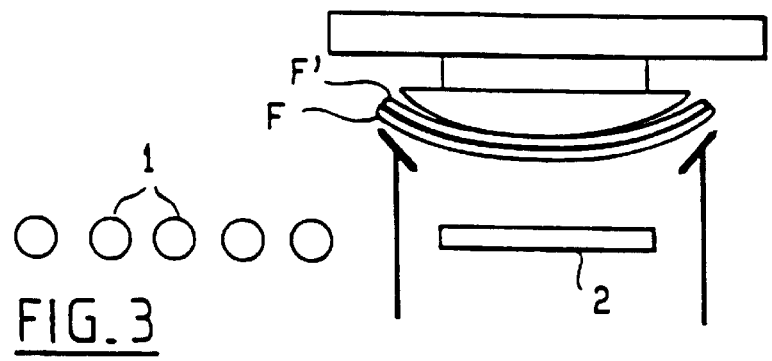
FIG_3
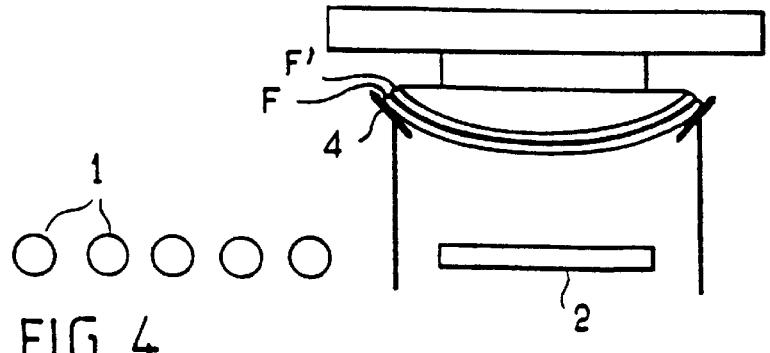
FIG_4

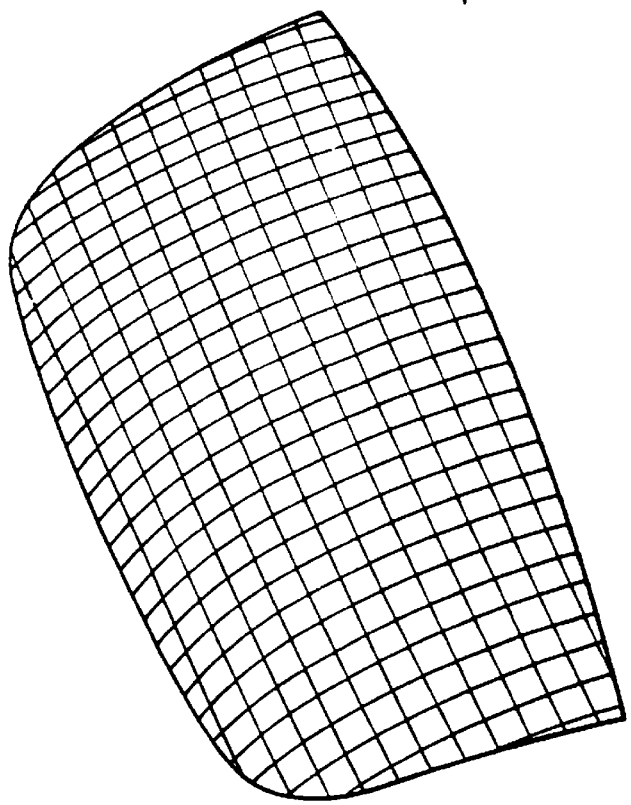
FIG._5.a
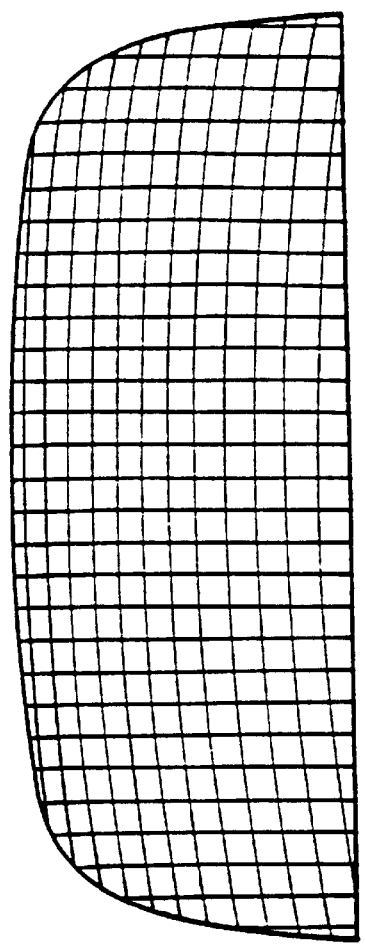
FIG._5.b
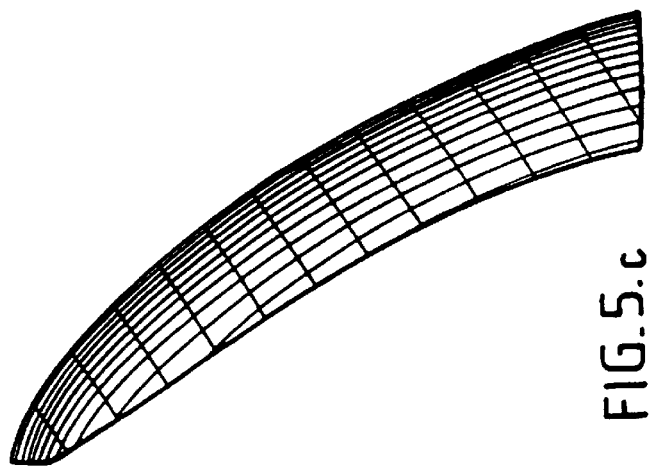
FIG._5.c

PROCESS FOR THE FORMING OF GLASS PLATES AND APPLICATION OF THE PROCESS TO OBTAIN GLAZINGS WITH COMPLEX SHAPES

This application is a Continuation of application Ser. No. 08/392,739, filed on Apr. 24, 1995, now abandoned, which is now a 371 application, No. PCT/94/00847, filed Jul. 7, 1994.

The present invention relates to procedures for forming glass sheets with a view to producing tempered, safety glazings for motor vehicles and/or which have been assembled with the aid of plastics sheets. More specifically, the invention aims at improving forming procedures in which the glass sheets are heated and conveyed in the horizontal position through a furnace by means of a flat conveyor and are then made convex in a thermally insulated enclosure before being passed into a cooling station.

Recent developments in the car industry have led to an ever increasing demand for glazings having complex shapes, with in particular locally, very pronounced curvatures and in particular non-developable shapes, derived from spherical, non-cylindrical shapes. In parallel, ever higher demands are being made on the optical quality. In the same way, a conformity to the principal curvature with close tolerances is required for all points of the surface of the glazing and not only for those close to its periphery.

Glazings have complex shapes are mainly obtained with the aid of two different technologies.

In the first, which is mainly used for glazings assembled by lamination, such as windscreens, one or two glass sheets are placed cold on a frame, whose peripheral geometry reproduces that which it is wished to give to the glass sheets and then the assembly is heated in a furnace in order to give it a convex shape by gravity. Over the last few years in order to meet the demand for ever more complex shapes, it has been proposed that pressing takes place at the end of the operation using a countermould.

In the second, which is mainly used for tempered or toughened glazings, a clear distinction is made between the stages of reheating the glass sheets, heated in a furnace which they traverse flat, conveyed by a roller bed or an air cushion, and the forming stages, which take place with the aid of tools only acting on the glass when its temperature is at a suitable level.

Thus, in the "tempering" methods, without this term having to exclude the manufacture of laminated glazings, there is a considerable reduction in the number of convex bending tools used and the immobilization time thereof for the production of a given glazing. In view of the very large number of car models, this reduction is a very important advantage, if only for the tool stock management difficulties avoided. In addition, the cycle times are generally much shorter in the case of "tempering" methods.

However, an immediate difficulty of such "tempering" methods using tools of a static nature in the sense that they do not leave the forming cell, is that there is a need for transfers of glass sheets from the conveyor to a first forming tool and in the case of complex shapes from said first tool to a complementary forming tool, which generally cooperates with the first tool and finally a support tool during cooling. All these operations can affect the quality of the glazing, because they lead to risks of marking and poor positioning, so that ultimately there is a poor optical quality and/or non-conformity with the principal curvature.

In addition, numerous so-called tempering processes are a race against time and with the aim of a greater control of the positioning of the tools, it is in fact simpler to place them in the open air outside the furnace. Under these conditions, it is obvious that the glass will cool during its convex bending. However, the tempering stage requires a minimum temperature making it necessary to overheat the glass in the furnace (but then necessarily its optical quality is affected) and/or very rapidly perform the convex bending, which is only possible if the sought shape is of a simple nature. It has admittedly been proposed to preform the glazings before passing them to a convex bending station by pressing between a solid male mould and a female mould, the preforming being obtained by passing the glass at the end of the furnace onto rotary elements such as rollers of the spindle or guide roll type, or onto guide boards. However, these elements are themselves an important source of defects and it is virtually impossible to correctly position the moving glass on such elements. A positioning prior to the entry into the preforming zone is certainly possible, but its effectiveness is relative and once again depends on the complexity of the desired shape, a "simple" shape being much more "tolerant" with respect to the positioning quality. Moreover, the preforming due to rotary elements is cylindrical, but it has been stated hereinbefore that the most complex shapes are spherical, with locally small longitudinal and transverse radii of curvature. Cylindrical preforming only makes it possible to approach one of these radii of curvature.

These cold technologies are opposed by hot technologies in which the forming cell is an integral part of the furnace or is at least thermally insulated so as to maintain therein a temperature substantially identical to the temperature of the glass when it leaves the furnace. It is then possible to extend by a few seconds the time devoted to the forming operation, which on the one hand makes it possible to minimize the temperature on leaving the furnace and on the other give more pronounced convex shapings by having adequate relaxing times to avoid any breaking of the glass.

In conventional variants of these technologies, the glass is transferred from the conveyor to a male mould, whose shape it adopts under the action of a pressure drop or vacuum (EP 3,391, EP 241, 355) or a rising hot air flow (EP 169,770), or gravity (WO-91/ 17962). Following this preforming in contact with the male mould, convex bending is completed with the aid of a centrally open, annular frame used in the case of pressing as a female countermould or more simply as a support during convex bending due to dropping onto said annular frame (drop forming). In the two former cases, the force acting during the preforming is also used for the transfer between the conveyor and the male mould. In the latter case, a suction pad supports the volume in order to deposit it on a lower, convex mould having a downwardly turned concavity.

It is common to all these processes that a preforming takes place by means of a solid male mould against which is applied the entire surface of the flat glass sheet, with the possible exception of a small marginal portion. In practice, the same is the case when the transfer between the conveyor and the male mould takes place with the aid of an annular frame, as proposed in European patent applications 520,886 and 93.401,165.1, the latter not having been published on the filing date of the present application. Thus, in these processes, the residence of the glass sheet on the annular frame is as short as possible and the different stages can take place in the form described hereinbefore: transfer/preforming on the male mould/convex bending by pressing with the annular frame.

The inventors have found that this procedure is not completely satisfactory when the shapes of the glazings are complex and in particular have a non-developability criterion, which locally exceeds 5, said criterion being defined by the formula $D=Ln\ (10^7/R_1 \times R_2)$, in which Ln designates the natural logarithm, $R_1$ and $R_2$ being equal to the main radii of curvature at the considered point and expressed in millimetres. It should be noted that this formula stresses the shaping problems which occur when both $R_1$ and $R_2$ are small.

The main difficulty encountered is the formation of marginal undulations or corregations, in the manner which can be observed on attempting to cover a sphere with the aid of a sheet of paper, where on the edges thereof there is always too much paper, so that there is a need for folds or undulations to form.

The inventors have found that this problem can be solved by a process for the convex bending of a glass plate heated to the convex bending temperature in a horizontal furnace, which it traverses carried by a flat conveyor, which passes it into a convex bending cell, where it is maintained at an ambient temperature substantially identical to the convex bending temperature, in which is provided a convex, solid, male mould in the direction of which the glass plate is vertically displaced by means of a concave, annular countermould in order to be pressed between the male mould and the female countermould, the contact between the glass and the male mould only taking place after a roughing phase by gravity forming on the annular countermould.

The term glass plate is used in the present invention in the sense of a glass sheet or optionally a stack of two or three superimposed glass sheets as from the time of entering the furnace and as will be described in detail hereinafter.

Thus, according to the process of the invention a blank is formed before the pressing phase, said blank being spherically bent. In the roughing phase, the central part of the glazing is advantageously free from any contact with a tool, which enables the glass to flow freely and compensate the non-developability of the shape imposed by the male mould by means of local thinning.

In a more particularly preferred variant of the invention, between the roughing phase and the pressing phase, there is a preforming phase during which the glass plate is applied against the male mould by forces of a purely pneumatic nature. During this preforming phase, the central part of the glass plate is in contact with the male mould and can consequently no longer be drawn. Nevertheless, a significant portion of the surface of the glass plate is still free from any contact with the forming tools, so that the glass can still deform in such a way as to envelop the male mould.

Thus, the forming process according to the invention consists of, in succession, the formation of a blank, the taking up again of said blank by the solid male mould and a finishing by pressing. Such a three-stage process is obviously only possible within the framework of a hot technology, where the glass is in a substantially isothermal enclosure and where the convex bending tools are permanently housed, so that normally there is no parasitic heat exchange which would interfere with the optics.

Proceeding according to the invention a blank is formed, which has a non-developable shape. During the roughing phase, the central part of the glass sheet is advantageously free from any contact. Due to the action of gravity forces, it is possible for extension stresses to occur in said central part leading to an elongation of the latter, which locally leads to a slight thinning of the glass. At the same time, the material close to the edges can flow in the direction of the central part. The undesired undulations do not form during the pressing against the male mould and the deformation which can be undergone by the periphery of the glass sheet is very small and there is no longer any glass "excess".

With the prior art processes, the central part of the sheet necessarily encounters the male convex bending mould first. As soon as contact has been established, it is no longer possible to elongate the central part in such a way that the periphery of the glazing cannot totally envelop the male mould and the flow of material can only act on a marginal, peripheral portion, which does not permit a true compensation, so that undulations form.

Advantageously, the process according to the invention leads to a more uniform treatment of the entire surface of the glass sheet, because the central part is in contact with the male mould for a period of time substantially identical to that of the remainder of the glass sheet. The distance to be covered in order to reach the male mould is, due to the gravity roughing stage, approximately the same for all points on the surface of the glass plate, so that the optical quality is improved.

In certain respects the process according to the invention can be likened to forming processes conventionally used for the production of laminated glazings. Nevertheless, it must be stressed that in that case it is a so-called tempering process, where the glass enters the flat convex bending cell and at the convex bending temperature, a single tool being used for treating all the volumes. In addition, the process according to the invention makes it possible to transfer the glass, after convex bending, to a tempering frame.

For performing the process according to the invention, it is e.g. possible to use a convex bending installation like that described in EP-A-520,886 and which has a horizontal furnace terminated by a convex bending cell, where the temperature is kept close to the glass sheet convex bending temperature, said convex bending cell having a member for supporting the glass in the extension of the glass sheet conveying plane and preferably of the air cushion type, a male mould having a downwardly turned convexity positioned above said support member, a concave, annular countermould, formed from a centrally open, continuous frame, displaceable between a bottom position under said conveying plane and a top position in the vicinity of the male mould and means for controlling the displacement speed of the annular mould between its top position and its bottom position. Preferably, the support member is integral with an assembly having a plate member installed beneath the convex bending cell, outside the thermally insulated enclosure and carrying, apart from the support member, the insulating floor of the bending cell and the annular countermould, the annular mould displacement speed control means being constituted by a system for controlling the motor-driven assembly of the annular countermould.

Such an installation can be used for obtaining thermally tempered glazings, provided that to the same is added a tempering station and means for transferring the convex bent glazings from the convex bending cell to the tempering station. It can also be used for the simultaneous convex bending of several glass sheets, which are then superimposed (generally in pairs) on entering the furnace, the stack being raised by the annular countermould, brought into contact with the male mould following an adequate time to permit roughing, engaged against the male mould by a vacuum created at the periphery of the glass sheet and then pressed against the male mould with the aid of the annular countermould. Following said passage, the glass sheets are kept for a few instants in contact with the male mould, time for lowering the lower countermould and introducing beneath the male mould a recovery frame which transfers the glass sheets into a controlled cooling station.

The process according to the invention is remarkable in the fact that there is no real modification to the installation (with the exception of the change to the convex bending tools in order to adapt to the desired shape) for passing from one production mode to another and only the cycle times devoted to the raising of the annular frame and the pressing have to be modified in order to transform an installation for tempered glazings into an installation for laminated glazings. It more particularly applies to the production of glazings locally having a non-developability criterion exceeding 5, which cannot be obtained with a good optical quality and a high principal curvature precision with the prior art processes.

BRIEF DESCRIPTION OF THE DRAWINGS

Other advantageous characteristics and details of the invention can be gathered from the following description relative to the drawings, wherein show:

FIGS. 1 to 4 a diagrammatic side view of forming in accordance with the process of the invention of a pair of glass sheets.

FIG. 5 a diagrammatic representation of a glazing having a non-developability criterion reaching the value 5, with a mesh pattern viewed in elevation (FIG. 5.1), front view (FIG. 5.2) and three-quarter view (FIG. 5.3).

Figure 6:
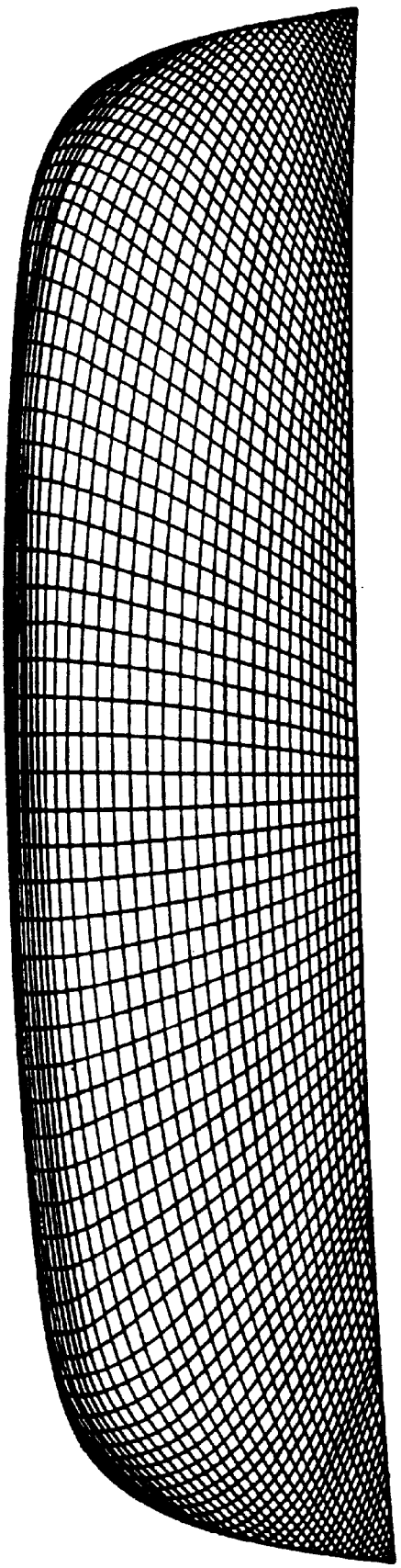
FIG. 6 the view of a test pattern reflected by the glazing of FIG. 5.

Some of the special features of the process according to the invention are described in greater detail hereinafter relative to FIGS. 1 to 4, which illustrate the performance of the invention with an installation identical to that described in EP-520,886, whose content is incorporated into the present specification by reference and to which reference should be made for further details.

Such an installation comprises a reheating furnace with a conveyor, preferably constituted by a flat roller bed 1. On leaving the furnace, the glass sheets, at a temperature of about 650° C. if they have to undergo a thermal tempering operation, or approximately 550° C. if it is a question of preparing a laminated glazing, enter the convex bending cell where they are supported by a support member, such as e.g. a hot air cushion, here symbolized by a chamber 2. For the construction of the latter, it is preferable to have a chamber with a plurality of individual, transverse compartments with respect to the conveyor axis. This type of air cushion makes it possible to avoid the unbalancing of the cushion at the time of the arrival of the glazing, when only the front edge of the latter is positioned vertically of the air cushion. For more details regarding such a compartmentalization reference is e.g. made to French patent application 92/08482 filed on Jul. 9 1992.

This convex bending cell or thermally insulated enclosure also has a convex, male mould 3, provided with means for maintaining in contact therewith a glass sheet, as well as a concave, annular countermould 4 moved between a bottom position beneath the glass sheet conveying plane and a top position in the vicinity of the male mould. The mould and countermould are referenced with respect to one another and only move in the vertical direction.

At the same time as the glass enters the convex bending cell, it is positioned by a set of focussing stops, placed ever nearer in the glass sheet advance direction. When several and in particular two superimposed glass sheets F,F' and not a single glass sheet are treated by interposing between them a separating or parting agent, such as e.g. a kieselguhr powder, said stops are preferably truncated cone-shaped stops having a diameter which is larger at the top than at the bottom, so as to position not only the lower glass sheet, but also the upper sheet which, for the purpose of forming the concave side of the laminated glazing, is normally slightly smaller than the lower sheet on the convex side. Preferably, said stops are also retractable.

In accordance with EP-520,886, the focussing stops are preferably referenced with respect to the upper, male mould, which is itself referenced with respect to the annular countermould, all these parts being obtained with a high machining precision and being preferably made from a part cast from pig iron or refractory steel.

As soon as the glass sheet or sheets are correctly focussed, the annular frame is raised, e.g. by means of motor-driven screw jacks, which are preferably placed outside the thermally insulated enclosure. According to the invention, the travel of these screw jacks is entirely controlled over their entire length and not only on approaching the male mould. For information purposes only, with a view to producing a glazing having a strong non-developability criterion, use has been made of the following parameters: raising the annular countermould 4s, preforming by the solid mould 2s, pressing with the annular countermould 1s. It is also possible to have a stop time, e.g. at mid-height and to have high speed movements, as hereinbefore. It is obvious that these times can differ between individual glazings, in particular as a function of the complexity of the shape to be obtained, as well as parameters such as the furnace exit temperature or the thickness of the glass sheets. However, it should be noted that the raising operation can have a duration substantially equivalent to the time during which the glass sheet is in contact with the male mould. During said raising and as shown in FIG. 2, the glass gives way on the annular countermould under the action of the gravity forces, being free from any contact with a tool, with the exception of the marginal portion which is in contact with the annular countermould.

As soon as the annular countermould has completed its rise and the blank has been formed, the glass sheet or sheets undergo suction action by a vacuum created at the periphery of the male mould. Thus, the glass is slightly disengaged from the annular frame (FIG. 3) and is engaged against the convex surface of the male mould. At this stage of the process, using a blank according to the invention and not a flat glass sheet offers at least two advantages. The first is that the distance to be covered by all the points of the glass sheet is substantially identical and the second is that the contact between the central part of the glass sheet and the male mould is much less violent. The preforming can be likened more to a taping operation than to a punching operation, as is sometimes the case with the prior art processes. As a result of this gentler contact, the optical quality of the glass is further improved.

The final stage shown in FIG. 4 is that of pressing by means of the annular countermould. With the process according to the invention, it is merely a question of a simple finishing stage in order to complete the geometry of the edges, which does not aim at creating compressive stresses with a view to compensating the surplus material, the latter having already been "absorbed" by the flow occurring during the roughing phase. Therefore, the breakage levels are reduced, because the risks of producing residual stresses are less and the glazing is already very close to its final shape, whilst simultaneously reducing optical marking risks.

At the end of the pressing operation, the glass sheet or sheets are kept in contact with the male mould for the time necessary for lowering the annular countermould beneath the flat glass conveying plane and for introducing beneath the male mould a frame for recovering the convex bent glass sheet or sheets. As a function of the particular case, this frame passes the convex bent glazing into a controlled cooling station, e.g. a radiative cooling station or into a tempering station, the recovery frame in the latter case being adapted to the discharge of the tempering air.

FIG. 5 shows a glazing shape, whereof the developability criterion locally exceeds 5, particularly due to a very significant curvature close to the wings. With the process according to the invention, this shape can be obtained with an excellent optical quality, as is shown in FIG. 6, which represents the real image of the reflection of a cross-hatched pattern projected onto a glazing obtained according to the invention and inclined by 45°, corresponding to the theoretical shape of FIG. 5. The deformation of the pattern is particularly small.

I claim:

1. A process for convex bending of a glass plate comprising:

heating the glass plate to a bending temperature while conveying the glass plate by a flat conveyor through a furnace;

conveying the glass plate to a convex bending cell which is heated substantially to said bending temperature, and wherein a convex male mould and a concave annular female countermould are disposed in said convex bending cell, said convex male mould and said concave annular female mould being located at a fixed horizontal position and aligned along a vertical axis;

performing a first preshaping step in which said glass plate is at least partially supported by said concave annular female countermould with said glass plate preshaped by gravity, including a sub-step of raising said glass plate by only said concave annular female countermould for a duration of time long enough so that a shape of said glass plate preshaped by gravity is substantially a final shape of said glass plate within said convex bending cell;

performing a second preshaping step after said first preshaping step in which said glass plate is applied against only said convex male mould by a pneumatic pressure within said convex bending cell; and performing a pressing step after said second preshaping step in which said glass plate is pressed between said concave annular female countermould and said convex male mould within said convex bending cell.

2. A process as recited in claim 1, wherein the glass plate is kept in contact with the convex male mould following the pressing step by suction.

3. A process as recited in claim 2, wherein said suction is obtained by a vacuum created in the vicinity of a periphery of the convex male mould.

4. A process as recited in claim 1, wherein said glass plate includes two glass sheets, which are superimposed on entering the furnace.

5. A process as recited in claim 1, wherein on entering the convex bending cell, the glass plate is immobilized on a means for supporting a central part of the glass plate, said means being surrounded by the concave annular female countermould.

6. A process as recited in claim 5, wherein said supporting means is a hot air cushion.

7. A process as recited in claim 1, including utilizing said process in producing glazings locally having a non-developability criterion exceeding 5.

8. A process as recited in claim 1, further including providing means for controlling a vertical displacement speed of the concave annular female counter-mould, and raising said concave annular female countermould during said first preshaping step at a speed controlled by the means for controlling.

9. A process as recited in claim 8, including providing as said means for controlling the vertical displacement speed of the annular countermould a motor-driven screw jack positioned outside a thermally insulated enclosure of said convex bending cell.

10. A process as recited in claim 1, wherein the second preshaping step includes utilizing as said pneumatic pressure a vacuum pressure about at least a portion of said convex male mould such that said glass plate engages said convex male mould and is disengaged from said concave annular female countermould.

11. A process as recited in claim 10, wherein the first preshaping step includes raising said concave annular female countermould so that a peripheral portion of said glass plate is supported by said concave annular female countermould.

12. A process as recited in claim 10, wherein said vacuum pressure is created in the vicinity of a periphery the convex male mould.

13. A process as recited in claim 1, wherein during said first preshaping step said glass plate does not contact said convex male mould, and in said second preshaping step said glass plate is applied against said convex male mould only by said pneumatic pressure.

14. A process as recited in claim 13, wherein in said second preshaping step said glass plate is disengaged from said concave annular female countermould.

15. A process as recited in claim 1, wherein said step of performing a pressing step is followed by a step of lowering said concave annular female countermould while said glass plate remains in contact with said convex male mould within said convex bending cell.

16. A process as recited in claim 15, wherein said step of lowering is followed by a step of introducing a frame beneath said convex male mould for recovering said glass plate having said final shape within said convex bending cell.

17. A process as recited in claim 16, wherein said step of introducing is followed by a step of cooling said glass plate having said final shape.

* * * * *